United States Patent
Zorc

(10) Patent No.: US 7,249,345 B2
(45) Date of Patent: Jul. 24, 2007

(54) METHOD AND SYSTEM FOR AUTOMATICALLY GENERATING SOURCE CODE BASED ON A MARK-UP LANGUAGE MESSAGE DEFINITION

(75) Inventor: Samo Zorc, Kirkland, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 657 days.

(21) Appl. No.: 10/086,939

(22) Filed: Feb. 28, 2002

(65) Prior Publication Data

US 2003/0167444 A1    Sep. 4, 2003

(51) Int. Cl.
*G06F 9/44* (2006.01)
(52) U.S. Cl. .................. 717/106; 717/114
(58) Field of Classification Search .......... 717/106, 717/114
See application file for complete search history.

(56) References Cited

U.S. PATENT DOCUMENTS

| | | | |
|---|---|---|---|
| 5,805,775 A * | 9/1998 | Eberman et al. | 706/11 |
| 6,031,549 A * | 2/2000 | Hayes-Roth | 345/474 |
| 6,249,755 B1 * | 6/2001 | Yemini et al. | 702/183 |
| 6,341,277 B1 * | 1/2002 | Coden et al. | 707/2 |
| 6,513,059 B1 * | 1/2003 | Gupta et al. | 709/202 |
| 6,778,971 B1 * | 8/2004 | Altschuler et al. | 706/55 |
| 6,792,466 B1 * | 9/2004 | Saulpaugh et al. | 709/229 |
| 6,823,495 B1 * | 11/2004 | Vedula et al. | 715/805 |

\* cited by examiner

*Primary Examiner*—Wei Zhen
*Assistant Examiner*—Qamrun Nahar

(57) ABSTRACT

A method and system for automatically generating source code based on a mark-up language message definition. A mark-up language message definition is received. A first in-memory representation of the message definition is generated based on the received message definition. A second in-memory representation of source code is generated based on the first in-memory representation of the message definition.

22 Claims, 7 Drawing Sheets

METHOD AND SYSTEM FOR AUTOMATICALLY GENERATING SOURCE CODE BASED ON A MARK-UP LANGUAGE MESSAGE DEFINITION

FIELD OF THE INVENTION

The present invention relates generally to the generation of source code, and more particularly, to a method and system for automatically generating source code based on a mark-up language message definition.

BACKGROUND OF THE INVENTION

With the explosive growth of business to business (B2B) eCommerce, the Internet presents incredible opportunities for businesses of all sizes. For example, business to business (B2B) eCommerce provides opportunities to find new customers, to streamline supply chains, to provide new services, and to secure financial gain.

Organizations that have moved their business online are already realizing significant economic and competitive gains, such as increased revenue, lowered costs, new customer relationships, innovative branding opportunities, and the creation of new lines of customer service.

The Extensible Markup Language (XML) is becoming the de-facto standard for describing the format and the meaning of electronic data in a portable way. One of XML's most wide spread use is to use XML in communication between multiple parties that need to send and receive data among each other in order to accomplish a particular task. These parties can be, for example, programs or systems.

For example, a sending party formats specific data according to an agreed specification and sends the formatted data to the receiving party. The receiving party, in turn, parses the data and uses the parsed data for further executions. Within XML framework, the agreed specification used for specifying the format and content of exchanged data is described with XML Schema.

Typically, the description or specification of the XTL Schema is stored in a special file.

In order for this communication scheme to operate, each party needs to have a mechanism for correctly generating and correctly parsing the communication messages. It is noted that these tasks are required to be performed by all parties involved in the communication regardless of any further specific execution performed by a particular party. Typically, each party has a software module that converts some kind of internal representation of the data, which may be specific for each involved party, to an external representation (e.g., a specified communication message in XML format) and vice versa (i.e., converts the external representation to an internal representation).

When a conversion module (e.g., an implementation of an XML message API) is implemented in a Java language, the most natural way for internal representation of the data is a Java object. One challenge is that programmers currently must manually write code (i.e., implement the conversion module that converts from Java objects to XML messages and vice versa). As can be appreciated, substantial effort and cost are needed to manually write code to perform these conversion tasks. This effort and cost escalate as the number of communication standards and formats increase since a new conversion code must be developed for each type of different communication standard and revisions thereof.

Based on the foregoing, there remains a need for a method and system for automatically compiling a mark-up language message definition into source code that overcomes the disadvantages of the prior art as set forth previously.

SUMMARY OF THE INVENTION

According to one embodiment, a mechanism is provided for automatically generating a conversion module (e.g., source code for conversion) directly from an XML schema message definition.

According to one embodiment of the present invention, a method and system are provided for automatically generating source code based on a mark-up language message definition. A mark-up language message definition is received. A first in-memory representation of the message definition is generated based on the received message definition. A second in-memory representation of source code is generated based on the first in-memory representation of the message definition. The source code can, for example, store information included in an XML message and manipulate information included in an XML message.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A method and system for automatically generating source code from a mark-up language message definition. In the following description, for t explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

It is noted that aspects of the present invention are described in connection with a mark-up language document (e.g., a mark-up language message definition in the Extensible Markup Language (XML)). However, it is to be appreciated that the teachings of the present invention extend to other documents that are described with other mark-up languages.

Figure 1:
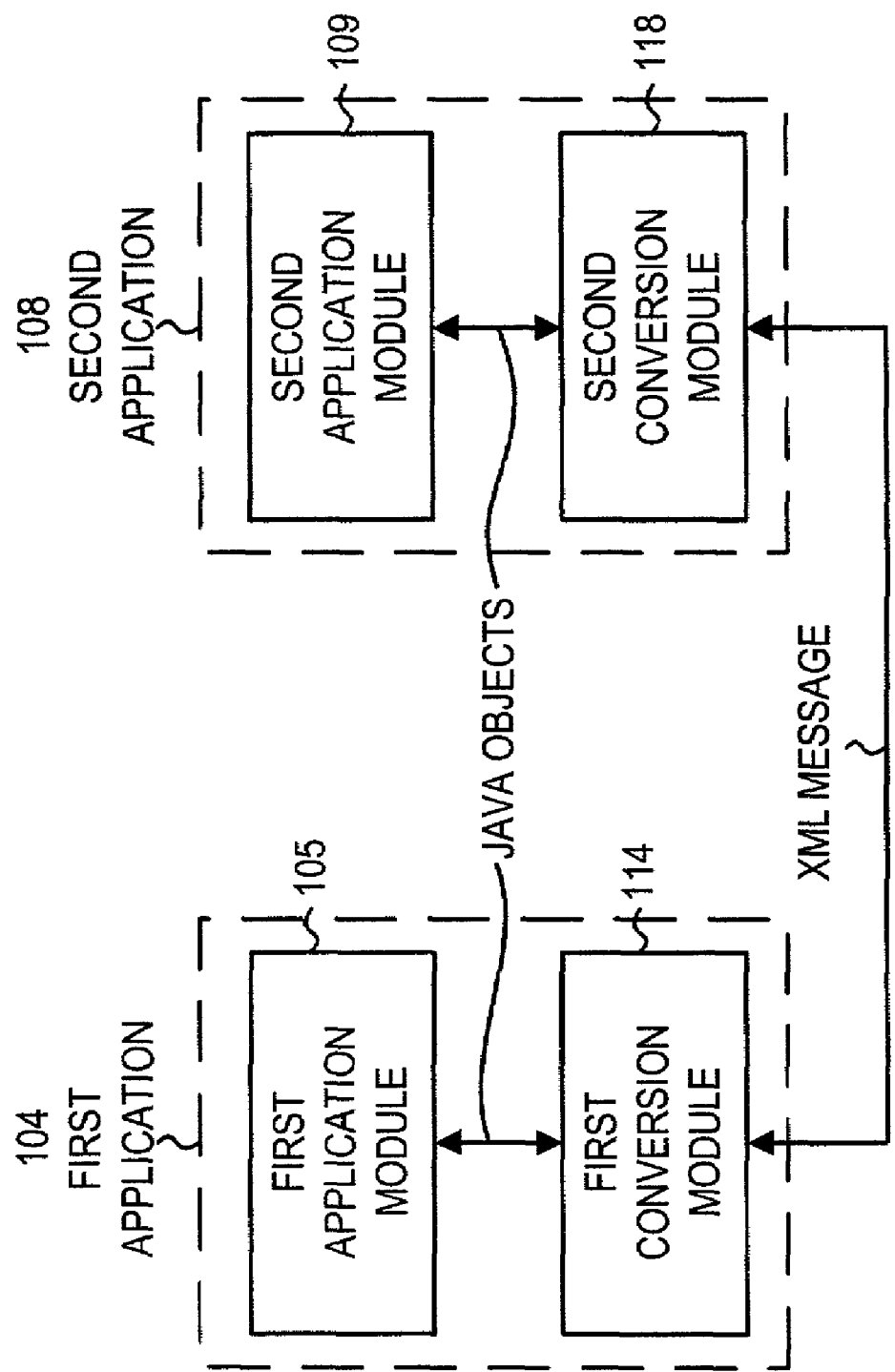
FIG. 1 illustrates a first application and a second application that communicate by using messages according to one embodiment of the present invention.

FIG. 1 illustrates a first application 104 and a second application 108 that communicate by using messages according to one embodiment of the present invention. The first application 104 and a second application 108 communicate by a predetermined communication standard through the use of messages.

Each application can include an application module and a conversion module. The conversion module may be automatically generated by the compilation mechanism of the present invention. For example, the first application 104 includes a first application module 105 for generating or receiving object-oriented code (e.g., Java objects). The first application 104 also includes a first conversion module 114 (e.g., a first XML message API). The first conversion module 114 converts Java objects into XML messages that may be sent to the second application 108 and converts received XML messages into Java objects for use by the first application module 105.

Similarly, the second application 108 includes a second application module 109 for generating or receiving object-oriented code (e.g., Java objects). The second application 108 also includes a second conversion module 118 (e.g., a second XML message API). The second conversion module 118 receives and converts Java objects into XML messages that may be sent to the first application 104 and also receives messages and converts the received messages into Java objects that may be used by the second application module 109.

As described previously, in order for this communication scheme to operate, each party needs to have a mechanism for correctly generating and correctly parsing the communication messages. It is noted that these tasks are required to be performed by all parties involved in the communication regardless of any further specific execution performed by a particular party. In this case, each party has a software module (hereinafter referred to as a conversion module) that converts some kind of internal representation of the data, which may be specific for each involved party, to an external representation (e.g., a specified communication message in XML format) and vice versa (i.e., converts the external representation to an internal representation).

The present invention provides a compilation mechanism for automatically generating the conversion module (i.e., the source code for the conversion module). The inventor has identified that the internal representation (e.g., Java objects), conversion, and external representation (e.g., XML messages) depend only on the specification of communication messages that may be specified using XML Schema. Consequently, the method and system for automatically generating source code can be employed to automatically generate a conversion module (e.g., the source code for conversion module) from the XML Schema message definition. For example, the compiling mechanism of the present invention can automatically generate the source code to accomplish the tasks performed by the first and second XML message APIs 114, 118.

Figure 3:
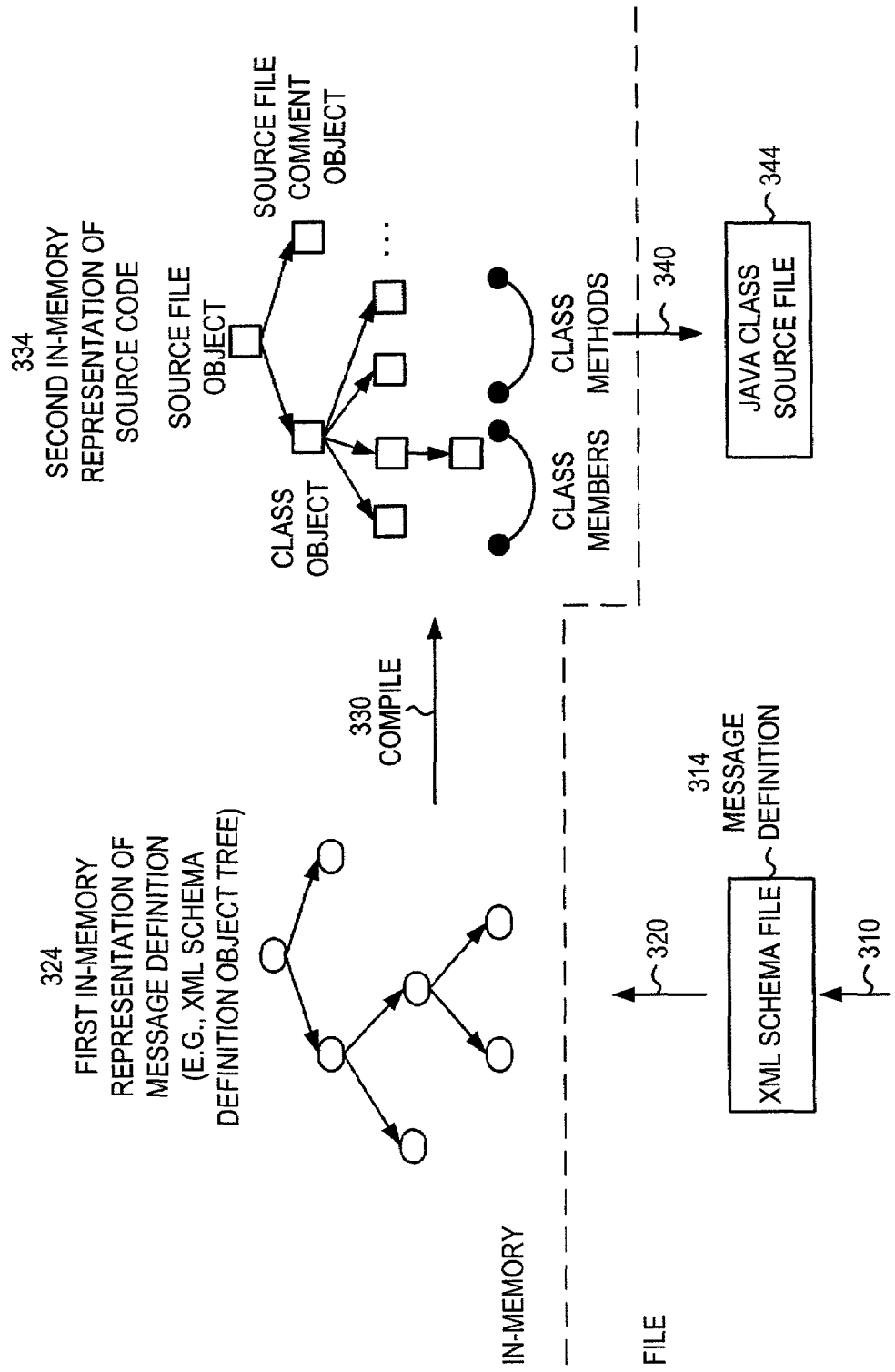
FIG. 3 is a flow chart illustrating the steps in the compilation process in accordance with one embodiment of the present invention.

FIG. 3 is a flow chart illustrating the steps in the compilation process in accordance with one embodiment of the present invention. In step 310, a mark-up language message definition 314 is received. The message definition 314 can be specified in a file (e.g., an XML Schema file). In one embodiment, each message includes a pointer that points to the message definition, which, for example, may reside on a server in the World Wide Web (WWW). In step 320, a first in-memory representation 324 of the message definition is generated based on the received message definition 314. The first in-memory representation 324 can be, for example, an XML Schema definition object tree. In step 330, a second in-memory representation 334 of definition of source code is automatically generated based on the first in-memory representation 324 of the message definition. For example, the first in-memory representation 324 can be compiled into a source object hierarchy. The second in-memory representation 334 can include class members, class methods, source file object nodes, class object nodes, and source file comment object nodes.

In step 340, the second in-memory representation or definition 334 of the source code is converted or written to a file 344 (e.g., a Java class source file).

XML Document Compilation

An XML document consists of XML elements that always appear as a pair of open/close tags (e.g., <tag></tag>) and XML attributes that always appear as a name/value pair of specific element (e.g., <tag attributeName=value>). The XML Schema document is itself an XML document that is written in the XML format.

The compiler of the present invention defines appropriate language compilation grammar to enable the compiler to compile XML Schema into Java source code (classes). As described previously, one challenge that needs to be overcome is that the compilation grammar is often not Context Free Grammar (CFG).

Figure 6:
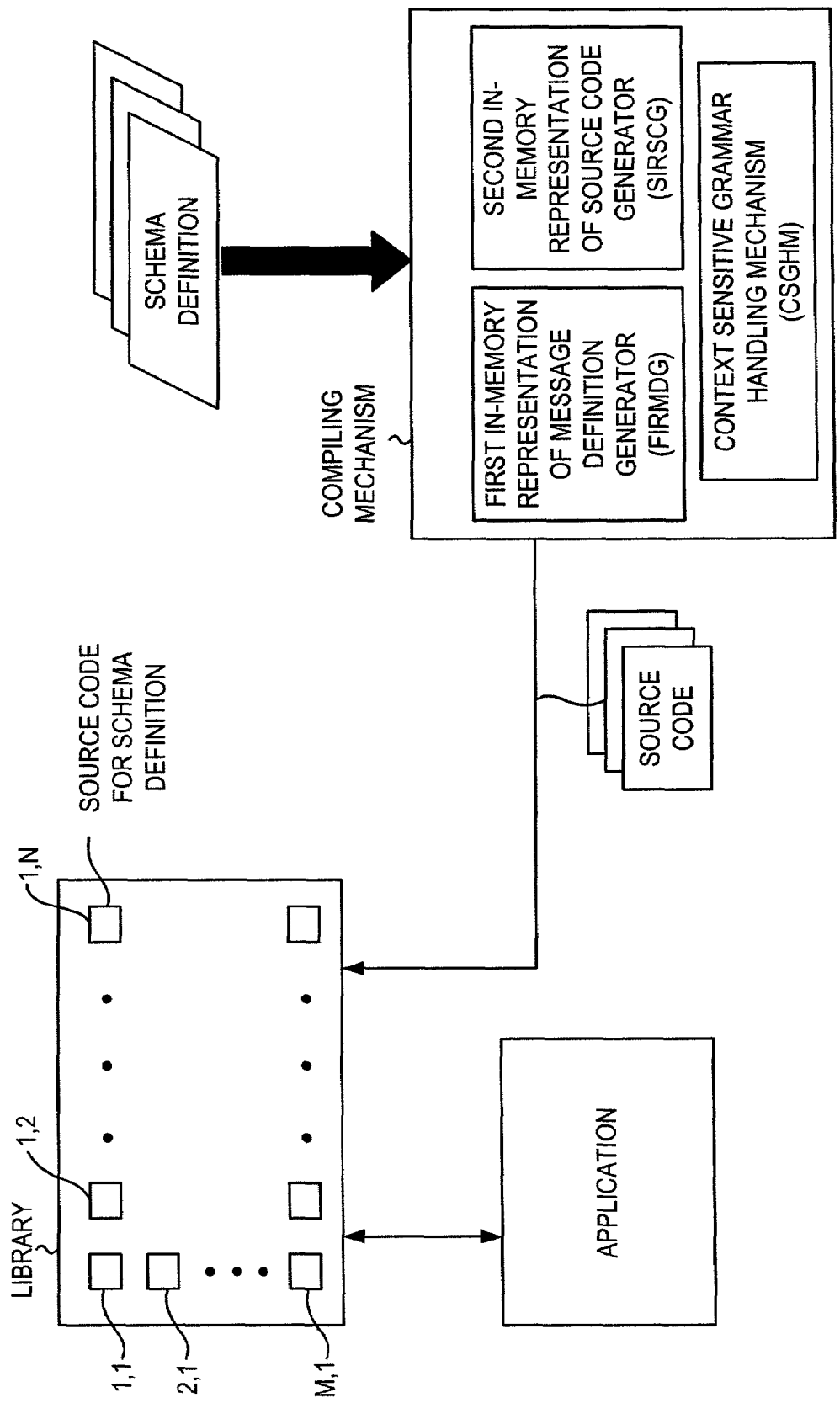
FIG. 6 illustrates a first application of the automatically generated source files.
Figure 7:
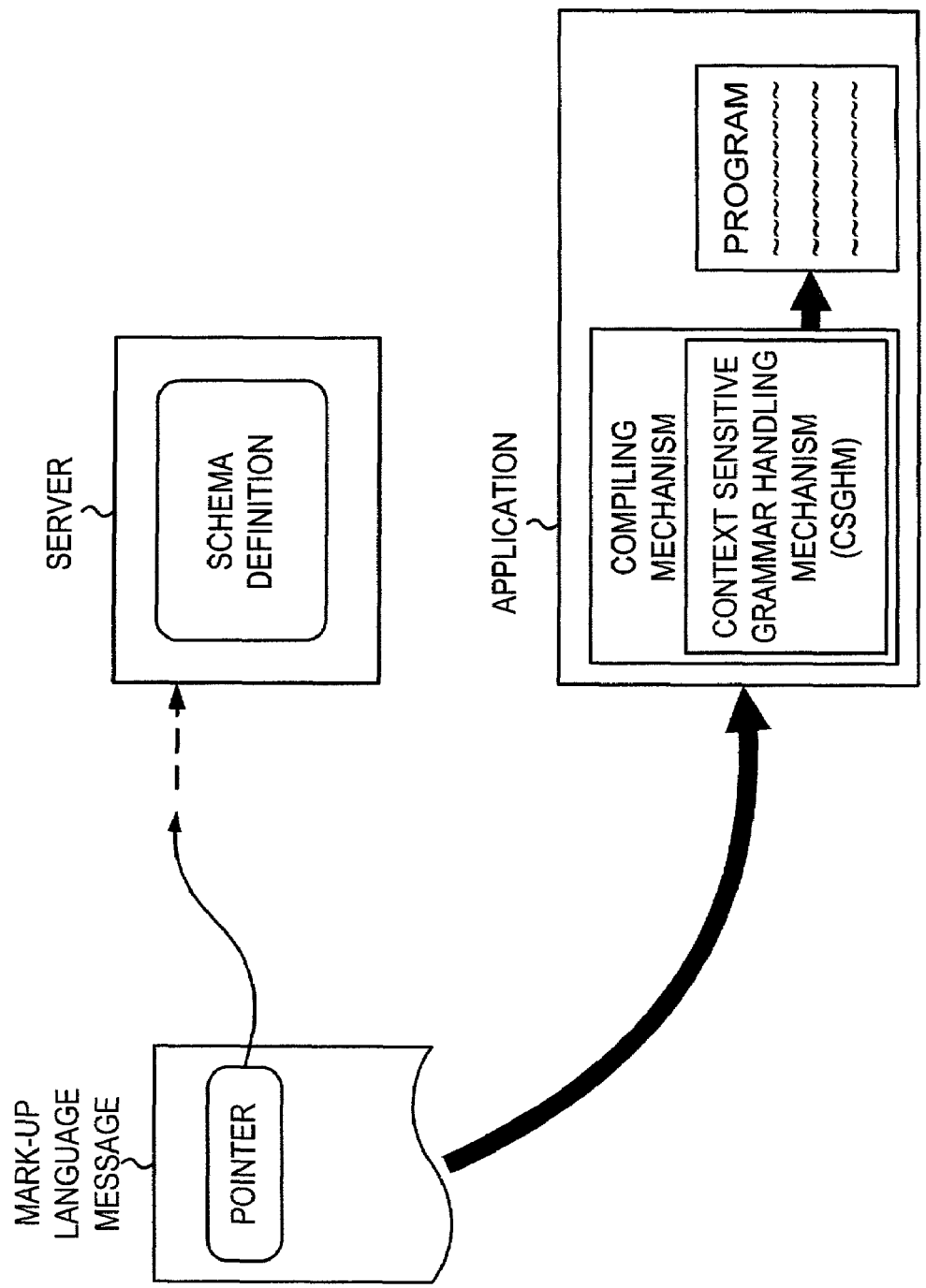
FIG. 7 illustrates a second application of the automatically generated source files.

In this regard, and referring to FIGS. 6 and 7, the compiling mechanism (e.g., compiler) of the present invention includes a context sensitive grammar (CSG) handling mechanism (CSGHM). When compiling a specific part of an XML Schema specification into some part of the Java code, the context sensitive grammar (CSG) handling mechanism considers not only the specific part of the XML Schema specification, but also the context of the specific part of the XML Schema specification (e.g., some other parts of the XML specification). In this regard, the compiler of the present invention generates an in-memory representation of the XML Schema file so that all needed context is available for each specific compilation step.

In one embodiment, the context sensitive grammar (CSG) handling mechanism evaluates the whole content of the parent XML message as the context for compilation. For example, when compiling the <restriction> part in the following XML Schema code:

```
<xsd:restriction base = "xsd:NMTOKEN">
    <xsd:enumeration value = "true"/>
    <xsd:enumeration value = "false"/>
</xsd:restriction>
``` the context sensitive grammar (CSG) handling mechanism considers the context, which is the whole <restriction> message that includes all possible <enumeration> children. On the other hand, <enumeration> itself does not have any direct independent translation since <enumeration> is compiled within some parent tag that defines its meaning.

Compiler Input—XML Schema File

The compiler of the present invention receives an XML Schema file as input. TABLE I illustrates an exemplary input file that is taken from UDDI API message specification, as set forth in UDDI v2 API specification and defined in XML Schema format. This specification defines a set of UDDI XML messages used for communication between clients in the UDDI framework. An example of a definition of one of the UDDI messages, "tModel," is described in TABLE I.

TABLE I

```
<xsd:element name ="tModel">
    <xsd:annotation>
        <xsd:documentation>This structure defines a metadata about a technology,
            specification or namespace qualified list (e.g. taxonomy,
            organization, etc.)
        </xsd:documentation>
    </xsd:annotation>
    <xsd:complexType>
        <xsd:sequence>
            <xsd:element ref="name" />
            <xsd:element ref="description" minOccurs="0" maxOccurs="unbounded"/>
            <xsd:element ref="overviewDoc" minOccurs="0" />
            <xsd:element ref="identifierBag" minOccurs="0" />
            <xsd:element ref="categoryBag" minOccurs="0" />
        </xsd:sequence>
        <xsd:attribute ref="tModelKey" />
        <xsd:attribute ref="operator" />
        <xsd:attribute ref="authorizedName" />
    </xsd:complexType>
</xsd:element>
```

The definition specifies that the "tModel" element, which represents an XML message, can have attributes, such as, "tModelKey", "operator" and "authorizedName." The definition also specifies that the "tModel" element can include several other elements (e.g., XML messages) in the body, such as, "description", "overviewDoc", etc.

The definition also defines the cardinality for each attribute and element. For example, all elements except "name" are optional (i.e., the XML Schema standard defines that if minOccurs is not specified, the element/attribute is required to be present).

TABLE II illustrates an exemplary definition of an attribute, "tModelKey". This definition defines that the attribute is of type string without any other restrictions.

TABLE II

```
<xsd:attribute name="tModelKey" type="xsd:string">
    <xsd:annotation>
        <xsd:documentation>A reference to a tModel.
        Usually used to represent
            the context to understand the keyName and
            keyValue values.
        </xsd:documentation>
    </xsd:annotation>
</xsd:attribute>
```

TABLE III illustrates an example of a "tModel" message according to this specification. This message can be used in communication within UDDI client applications.

TABLE III

```
<tModel tModelKey="..." operator="..." authorizedName="...">
    <name> ... </name>
    <description> ... </description>
    <overviewDoc> ... </overviewDoc>
    <identifierBag> ... </identifierBag>
    <categoryBag> ... </ categoryBag>
</tModel>
```

Compiler Output—Java Class Source File

The output of the compiler is a set of Java class source files that represent Java objects, which are able to store information presented by XML messages in runtime. Furthermore, these objects need to provide some standard methods for manipulation of the stored information.

Figure 2:
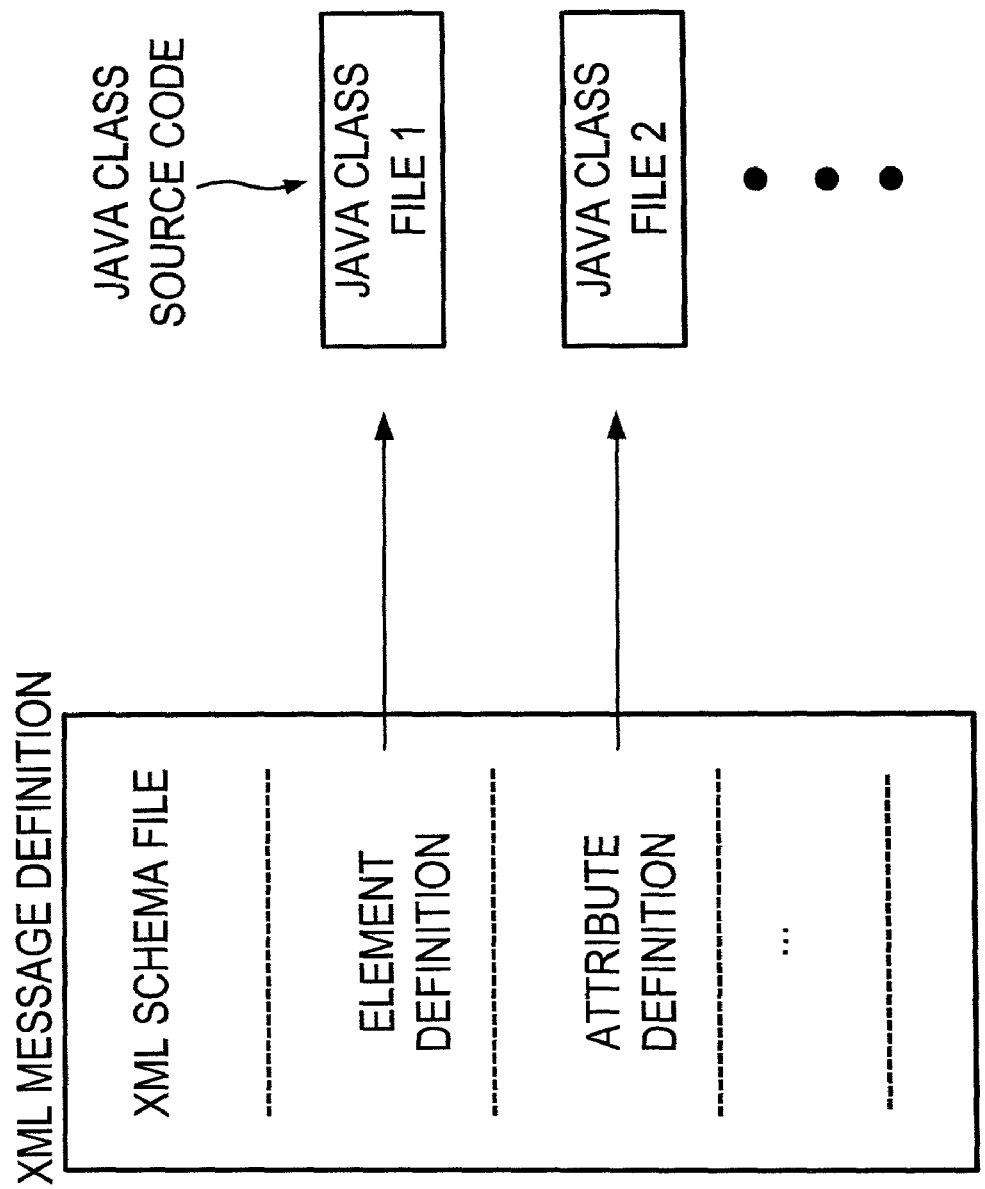
FIG. 2 illustrates how the compilation task can be partitioned in accordance with one embodiment of the present invention.

Referring to FIG. 2, the compiler of the present invention generates one or more sources files, where each source file can represent one Java class. In one embodiment, each XML message (defined as a separate XML Schema element) and each XML attribute (defined as a separate XML Schema attribute) is represented by a separate Java object (i.e., compiled into separate Java class source files.

Each class can include class members that correspond to each of the possible child elements and attributes of the XML message. Furthermore, the present invention provides a generic API for accessing and manipulating the content of the class. For example, the API methods can include, but are not limited to, add/get methods for each present class member (e.g., element and attribute), method that returns XML representation (e.g., message) of the object, and method that validates the content of an object (e.g., validates all object members).

TABLE IV illustrates an exemplary compiled source file. It is noted that the source file can include some other methods and members, which are not shown in order to unnecessarily obscure the teachings of the present invention.

TABLE IV

```
/*
* HEADER ...
*/
package ...
import ...
class NAME extends SOME_PARENT_CLASS {
    // child messages
    public Message1 element1;  //1st member
    representing child message
    public MessageN elementN;  //Nth member representing
    child message
    // message's attributes
    public Attribute1 attr1;   //1st member
    representing message's attribute
    public AttributeN attrN;   //Nth member representing
    message's attribute
    // add/get methods for each child message
    public Message1 addElement1( );
    public Message1 getElement1( );
    public MessageN addElementN( );
    public MessageN getElementN( );
    // add/get methods for each attribute
    public Attribute1 addAttr1( );
    public Attribute1 getAttr1( );
    public AttributeN addAttrN( );
    public AttributeN getAttrN( );
```

TABLE IV-continued

```
    // method that returns the XML representation
    public String toXML( );
    // method that validates member information
    public void validate( );
}
```

TABLE V illustrates an exemplary Java source file that is generated when the "tModel" example, described previously, is compiled in accordance with one embodiment of the present invention.

TABLE V

```
/*
 * HEADER ...
 */
package ....
import ....
class TModel extends SOME_PARENT_CLASS {
    // child messages
    public Name name;
    public Description description;
    public IdentifierBag identifierBag;
    public CategoryBag categoryBag;
    // message's attributes
    public TModelKey tModelKey;
    public Operator operator;
    public AuthorizedName authorizedName;
    // add/get methods for each child message
    public Name addName( );
    public Name getName( );
    ...
    public CategoryBag addCategoryBag( );
    public CategoryBag getCategoryBag( );
    // add/get methods for each attribute
    public TModelKey addTModelKey( );
    public TModelKey getTModelKey( );
    ...
    public AuthorizedName addAuthorizedName( );
    public AuthorizedName addAuthorizedName( );
    // method that returns the XML representation
    public String toXML( );
    // method that validates member information
    public void validate( );
}
```

It is noted that when the above source file is compiled, any Java code can then use the compiled code to store information about a corresponding "tmodel" XML message.

Compilation Mechanism

Since the grammar for the language that compiles XML Schema file into source files does not belong into CFG class of grammars, the compilation cannot be done on the fly (i.e., in one pass through the input source (XML Schema file)).

In this regard, the context sensitive grammar handling mechanism reads and store in memory an appropriate portion of the XML Schema file that represents the whole context of the element to be compiled.

In one embodiment, this appropriate portion is either the definition of an element (XML message) or an attribute (XML attribute) since compilation of one element or attribute is inherently independent from the compilation of other elements or attributes.

The compiling mechanism of the present invention creates a special set of objects for storing of the XML Schema information, where there is one object for each XML Schema definition message according to the XML Schema grammar. For example, there is an object for each of the following: <xsd:element>, <xsd:attribute>, <xsd:annotation>, <xsd:documentation>, etc. This storage approach supports a compilation, where each object implements a specific compile behavior. The use of each object to implement a specific compile behavior is described in greater detail hereinafter.

In one embodiment, each object knows how to compile itself into the source code primitive. For example, each object includes a toSource( ) method for this purpose that recursively calls the toSource( ) methods of its descendants. It is noted that the storing of the XML Schema information can be achieved in other different ways.

Moreover, the compilation method and system of the present invention generates a special set of Java objects that represent an arbitrary Java class source file and that has arbitrary members, methods and definitions. For example, there is an object corresponding to a whole source file, including objects for file declaration comment, package name, import statements and class definition. The object for class definition includes objects corresponding to declaration statement, specific class member definition, method definition, etc. To write such a hierarchy to an actual source file, the present invention programs each source object to know how to write itself into the Java source file. In one embodiment, each source object includes a toString( ) method that recursively calls toString( )method of its descendents for this purpose.

Part of XML Schema that corresponds to element or attribute is first read from the file and appropriate schema object hierarchy is constructed. This object hierarchy is then compiled into source object hierarchy, which is afterwards written to Java source file.

One novel aspect of the present invention is how the compilation is performed. According to one embodiment of the present invention, the compilation process of the present invention includes schema object tree traversal, where on each node something needs to be done on the source object tree. As described earlier, the compilation grammar is CSG, which means that compilation step in each node is not independent, but rather the compilation depends on the context. For example, the compilation step can depend on one or more of the child nodes, the parent node, both child node(s) and the parent node, or on neither the parent node nor the child nodes.

Figure 4:
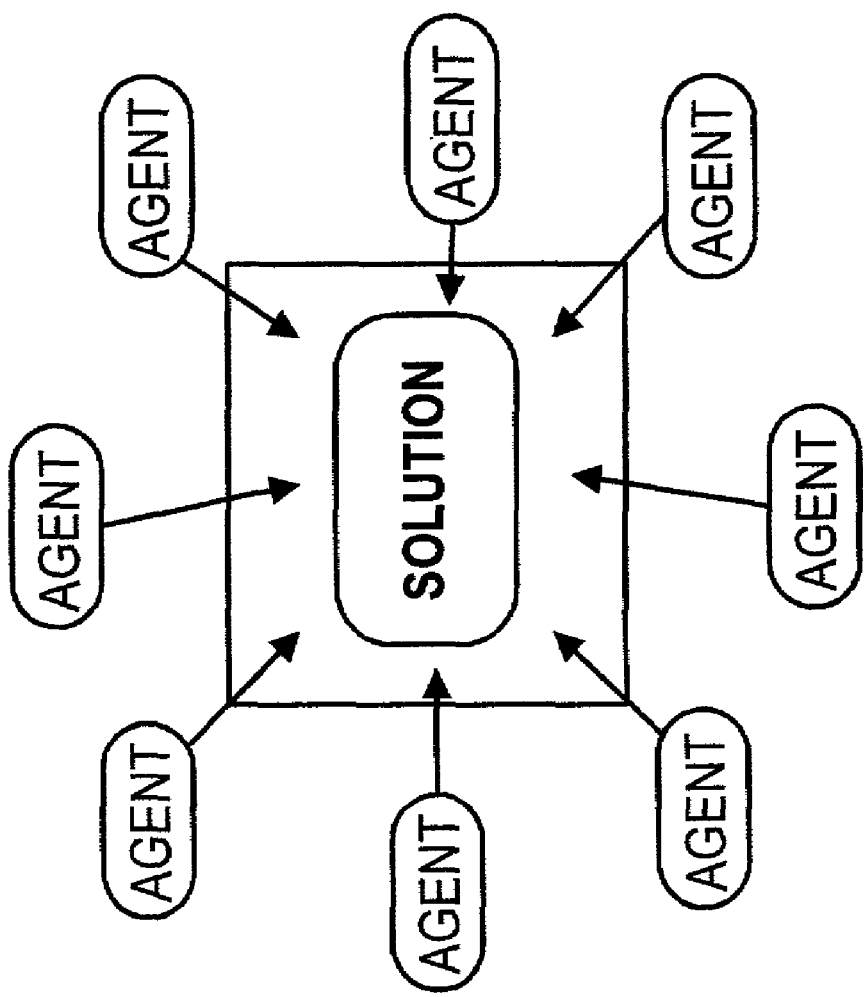
FIG. 4 illustrates an artificial intelligence blackboard architecture that may be utilized by the present invention.

Referring to FIG. 4, the compilation mechanism according to one embodiment of the present invention employs a blackboard architecture known from artificial intelligence (AI) problem solvers. This blackboard approach assumes that there are number of independent agents working together on the solution, where each of them can only do some localized action on the solution without knowing anything about what others are doing or anything about global process behavior.

Each agent constantly monitors the current state of solution and acts when the solution state exhibits specific properties that trigger its action. Agents are in general not synchronized with each other and work in a first come first served (FCFS) mode.

The agent takes the current solution from blackboard, performs some processing that the agent is designed to perform, and returns the solution back on the blackboard.

Using this architecture, the compiling process of the present invention is defined as a process where nodes in schema object tree act as agents, and the source object tree acts as solution. The whole process is not performed in a FCFS manner, but rather controlled by traversing the schema object tree.

Figure 5:
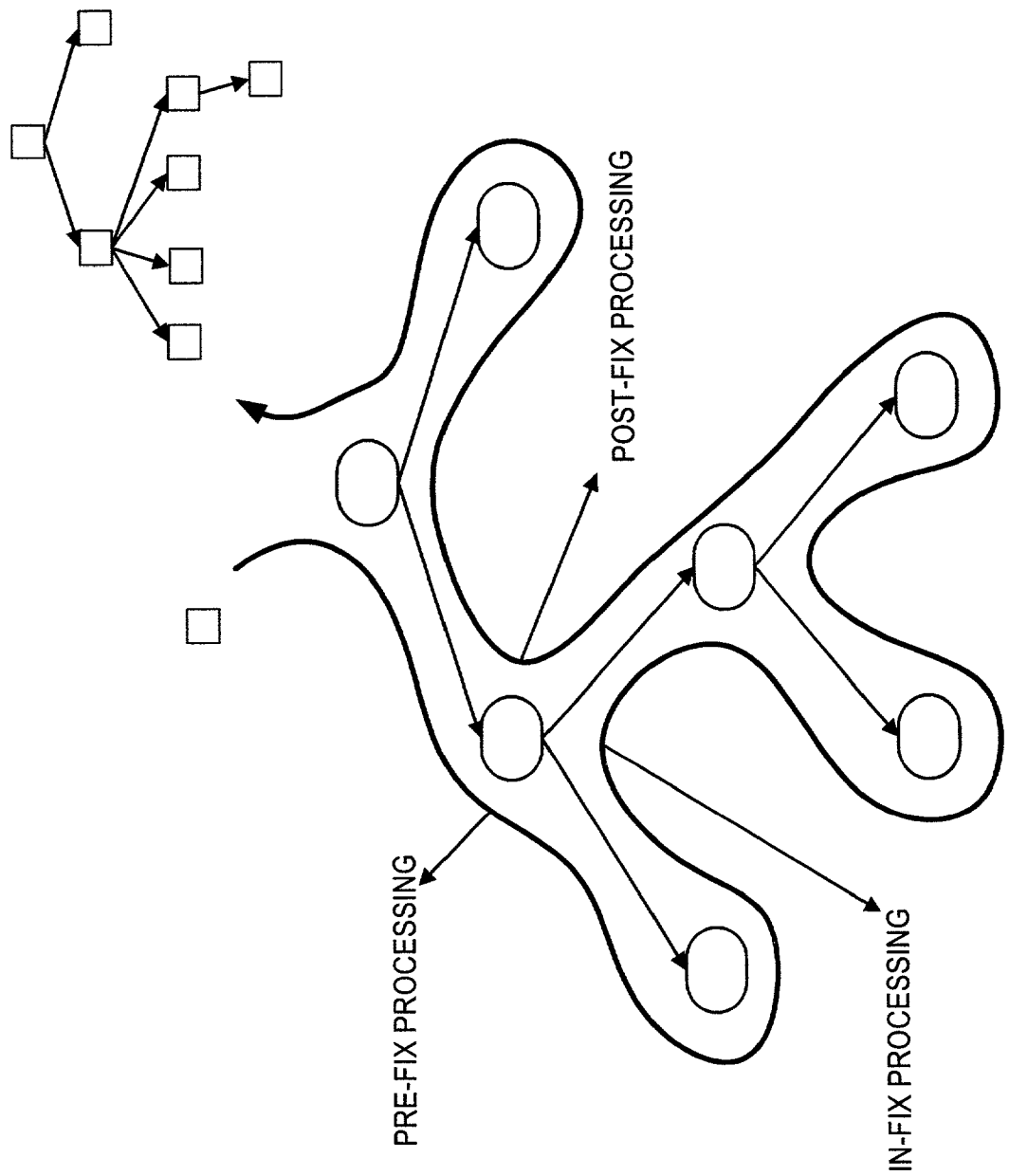
FIG. 5 illustrates the compiling process implemented as a blackboard architecture according to one embodiment of the present invention.

The process starts by creating an initial solution (e.g., a source object that represents an empty source file). The initial solution is then sent through the schema object tree (i.e., through all agents) in a depth-first manner. Each node has the opportunity to work on the solution, usually by adding some source primitive objects into the source tree while the solution is in the node's hands. Referring to FIG. 5, after traversing the whole schema object tree, the source object tree is fully constructed and represents the proper Java source file.

The context sensitivity handling mechanism handles the context needed to correctly execute the compilation in each schema object node. In one embodiment, each schema node can determine the context it needs by gathering information from its child nodes (e.g., by calling a specific children function). If there is a need for a child node to have some information from its parent (e.g., context from the parent), it is the responsibility of the parent node to provide the context when the child node function is called. Referring to FIG. 5, each node has three occasions to fully execute its compilation step: 1) pre-fix processing, 2) in-fix processing and 3) post-fix processing.

To execute the compilation step in a node, each node has a function toSource( ) that may have a form as set forth in TABLE VI.

TABLE VI

```
void toSource (source_node_tree) {
pre-fix_processing( );
child1.toSource(source_node_tree);
in_fix_processing( );
chindN.toSource(source_node_tree);
post_fix_processing( );
}
```

Since the meaning of schema tags is clearly defined, those functions can be simply hard-coded in the corresponding schema objects. Some examples that show the compilation process in greater detail are now described.

The present invention generates and utilizes in memory data structures (e.g., schema object tree, source object tree) to define the compilation process and employs a blackboard architecture to handle context sensitivity of the compilation grammar.

FIRST EXAMPLE

TABLE VII illustrates an exemplary XML Schema message definition. <xsd:attribute name="tModelKey" type="xsd:string">

TABLE VII

```
<xsd:annotation>
    <xsd:documentation>A reference to a tModel.
    Usually used to represent
        the context to understand the keyName and
        keyValue values.
    </xsd:documentation>
</xsd:annotation>
</xsd:attribute>
```

TABLE VIII illustrates an exemplary XML Schema definition object tree (e.g., an in memory presentation) that is generated based on the exemplary XML Schema message definition of TABLE VII.

TABLE VIII

```
attribute (name="tModelKey", type="xsd:string")
 |
 - annotation
    |
    - documentation (A reference to a tModel. Usually used to represent
        the context to understand the keyName and keyValue values.)
```

"Attribute" is the root node. "Annotation" is a child node of "Attribute" that in turn has a "documentation" child node. The compilation starts with node "attribute" which in prefix-processing creates an initial source object, defines the class name as "TModelKey", and adds a member of type "xsd:string" to the source object with all corresponding methods. TABLE IX illustrates an exemplary abstraction of a created in-memory source tree (e.g., an abstraction of the created source code). The result of the first step of compilation in the node "attribute" is shown.

TABLE IX

```
package ....
import ....
class TModelKey extends Object {
// child messages
public String attr1;
// add/get methods for each child message
public String addAttr1(String value) {
attr1 = value;
return attr1;
}
public String getAttr1( ) {
return attr1;
}
...
}
```

Then, the "attribute" node sends the constructed source object to the "annotation" node for further processing. In this case, there is no need for subsequent in-fix of post-fix processing. This node, according to our compilation grammar, does not perform anything, but forwards the source object to the "documentation" node. During pre-fix processing, the "documentation" node adds a class comment to it.

TABLE X illustrates exemplary results of the compilation in the node "documentation".

TABLE X

```
package ....
import ....
/*
* A reference to a tModel. Usually used to represent the context to
understand
*the keyName and keyValue values.
*/
class TModelKey extends Object {
// child messages
public String attr1;
// add/get methods for each child message
public String addAttr1(String value) {
attr1 = value;
return attr1;
}
public String getAttr1( ) {
return attr1;
}
...
}
```

SECOND EXAMPLE

Another example that shows the CSG type of feature handling is the compilation of the following XML Schema message definition:

```
<xsd:attribute name="tModelKey" type="xsd:string">
    <xsd:restriction base = "xsd:string">
        <xsd:enumeration value = "true"/>
```

-continued

```
    <xsd:enumeration value = "false"/>
  </xsd:restriction>
</xsd:attribute>
```

The generated XML Schema definition object tree (in memory presentation) created would be the following:

```
attribute (name="tModelKey", type="xsd:string")
  |
  - restriction (base = string)
      |
      - enumeration (value = "true")
      |
      - enumeration (value = "false")
```

The compilation starts with node "attribute" in which pre-fix-processing creates an initial source object, defines the class name as "TModelKey", and adds a member of type "xsd:string" to the source object with all corresponding methods TABLE XI illustrates an exemplary abstraction of the created source code (e.g., an abstraction of a created in-memory source tree). The results of the first step of compilation in the node "attribute" are shown. It is noted that there is no need for subsequent in-fix of post-fix processing.

TABLE XI

```
package ....
import ....
class TModelKey extends Object {
// child messages
public String attr1;
// add/get methods for each child message
public String addAttr1(String value) {
attr1 = value;
return attr1;
}
public String getAttr1( ) {
return attr1;
}
...
}
```

Then, the "attribute" node sends the constructed source object to "restriction" node for further processing. At this point, the compilation is context sensitive. Namely, "restriction" in general gets translated as shown in TABLE XII.

TABLE XII illustrates exemplary results of the compilation in the node "restriction." In addition to the usual elementX string member, getElementX( ) and setElementX( ) functions, restrictions require also additional "restrict" string member and additional value checking in the setElementX( ) call.

However, a problem is that subsequent "enumeration" objects specified in the XMLSchema are optional, which means that presented translation works for all cases with one or more "enumeration" objects, but not for the case where there are no "enumeration" objects (because the "restrict" member that holds allowed values would be empty, and logic in the setElementX( ) method would always fail). This effectively shows that the rule for compilation of "restriction" depends on subsequent child nodes, which represent the "restriction" node's context. This rule is a context sensitive grammar rule (CSG).

When there are no "enumeration" subsequent child objects, compilation does not insert the usual "restrict" string member and the value checking logic.

TABLE XII

```
package ....
import ....
class TModelKey extends Object {
    // child messages
    public String attr1;
    public String element1;
    private String[] restrict = {"true","false"};
    // add/get methods for each child message
    public String addAttr1(String value) {
        attr1 = value;
        return attr1;
    }
    public String getAttr1( ) {
        return attr1;
    }
    public String addElement1(String value) {
        boolean allowed_value = false;           // additional
        for (int i; i < restrict.length; i++) {  // restriction
            if (value.equals(restrict[i]))       // value
                allowed_value = true;            // checking
        }                                        // logic
        if (allowed_value == false)              //
            return null;                         //
        attr1 = value;
        return attr1;
    }
    public String getElement1( ) {
        return attr1;
    }
    ...
}
```

According to one embodiment of the present invention, the usual string "elementX" and corresponding getElementX( ) method are inserted in the pre-fix processing. Thereafter, the compilation is sent down to the children nodes, where all the allowed values are gathered. After the compilation is returned in "restriction" node, post-fix processing checks to determine whether there were any values defined. When values are defined, the processing adds "restrict" string member with values gathered and the setElementX( ) method with value checking logic. When no values are defined, only the usual setElementX( ) method without value checking logic is added.

Usage Scenarios

The compilation method and system of the present invention can be used in a variety of different scenarios. Two exemplary scenarios that include a static scenario and a dynamic scenario are now described. In both cases, a user defines a communication API by specifying the XML communication messages using XML Schema. The static scenario and the dynamic scenario are described in greater detail hereinafter in FIGS. 6 and 7, respectively.

Static Scenario

FIG. 6 illustrates a first application of the automatically generated source files. In the first embodiment, a user can use the compiler of the present invention only once in order to compile a required XML message definition into an API communication library. Once generated, the communication library may be accessed and used by any client application that wants to communicate using the defined messages. In this case, the communication library (e.g., the compiled source classes) is statically linked to any application, which can then use the source classes directly. The compiling mechanism of the present invention can include a first in-memory representation of message definition generator (FIRMDG) and a second in-memory representation of source code generator (SIRSCG) for performing steps 320 and 330, respectively. The compiling mechanism of the present invention can include the context sensitive grammar handling mechanism (CSGHM) described previously.

Dynamic Scenario

FIG. 7 illustrates a second application of the automatically generated source files. In a second embodiment, the compiler of the present invention is integrated with the client application. In this case, the client application can employ the compiler of the present invention to generate the required communication library on-the-fly based on a received XML message and its XML Schema definition (i.e., an on-the-fly generation of a communication library). In this manner, the client application is able to understand any message without recompilation or reconfiguration, provided that the XML Schema of the message is readily available.

Exemplary Implementation of a Compiler Using SAX Parser

An exemplary implementation of a compiler according to one embodiment of the present invention is now described. The SAX parser is an event driven parser, which goes through an XML file and returns parser specific events by calling specific call-back function. The most important call-back functions for our compilation are:

startDocument ( ): called at the beginning of the XML document endDocument( ): called at the end of the XML startElement (String namespaceURI, String localName, String qName, Attributes atts): called for each starting tag, giving also all its attributes endElement (String namespaceURI, String localName, String qName) called for each ending tag characters (char ch[], int start, int length) called for each set of characters in or outside the tag body.

In one implementation of the compiler of the present invention, throughout the parsing of XML Schema file, startElement( )events occur in which the new element are added to the XML Schema hierarchy. Whenever the endElement( ) event occurs for the tag representing the object to be converted to Java source code (e.g., XML Schema element or attribute), thereby indicating that all information is readily available for compilation, a new source code object is created and sent through the XML Schema hierarchy. Furthermore, the source object is written in the Java source file; the XML Schema hierarchy is released from memory, and parsing continues with the next object.

After all Java source classes are constructed, the complete parsing API is made by including the generic implementation of SAX parser call-back functions (e.g., the implementation of SAX ContentHandler and ErrorHandler) and an API object factory. The complete parsing API can be compiled into jar file and used it as an API communication library that can be used by any client that wanted to communicate using defined XML messages.

The compiler of the present invention automatically generates Java source code (e.g., class files) for manipulating XML messages based on their XML Schema definition. The compiler of the present invention defines and uses data structures (e.g., schema object tree and source object tree) and employs a blackboard architecture to define the compilation process that handles grammar context sensitivity.

The principles of the present invention are described in the context of a compilation method and system for automatically generating Java class source files from an XML Schema file. However, it is noted that the teaching of the present invention can be applied to other structured language schema definitions to generate source files for other object-oriented languages.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for automatically generating source code for manipulating at least one mark-up language message based on a mark-up language message definition, the method comprising:

receiving the mark-up language message definition;

generating a first in-memory representation of the message definition based on the received message definition;

generating a second in-memory representation of a source code based on the first in-memory representation of the message definition, said generating a second in memory representation comprising generating a schema object tree by employing a blackboard architecture that includes agents and solutions; wherein the schema object tree includes one or more nodes; and wherein the nodes of the schema object tree are agents and the nodes of an associated source object tree are the solutions; and generating source files based on the second in-memory representation of the source code.

2. The method of claim 1 wherein the first in-memory representation is a schema object tree corresponding to an XML Schema message definition; wherein the schema object tree includes one or more nodes.

3. The method of claim 1 wherein the second in-memory representation includes one of class members, class methods, source file object nodes, class object nodes, and source file comment object nodes.

4. The method of claim 1 wherein the second in-memory representation includes elements and attributes; wherein the generating source files based on the second in-memory representation of the source code comprises writing the elements and the attributes into respective Java class source files.

5. The method of claim 1 wherein the generating a source object tree by employing a blackboard architecture comprises performing context sensitive compilation while generating each node of the source object tree.

6. The method of claim 5 wherein the performing context sensitive compilation while generating each node of the source object tree comprises performing pre-fix processing.

7. The method of claim 5 wherein the performing context sensitive compilation while generating each node of the source object tree comprises performing in-fix processing.

8. The method of claim 5 wherein the performing context sensitive compilation while generating each node of the source object tree comprises performing post-fix processing.

9. The method of claim 1 wherein the mark-up language is XML.

10. The method of claim 1 wherein the mark-up language message definition is an XML schema message definition.

11. The method of claim 1 wherein the source code stores information included in at least one XML message.

12. The method of claim 1 wherein the source code manipulates information included in at least one XML message.

13. The method of claim 1 wherein the method generates a communication API based on an XML schema definition.

14. The method of claim 1 and further comprising automatically parsing cdntext sensitive grammar in the compilation of XML schema to source code.

15. A method for automatically generating source code for manipulating at least one mark-up language message comprising: receiving a schema definition for a mark-up language message; generating a first in-memory representation of the schema definition based on the schema definition; generating a second in-memory representation of source code based on the first in-memory representation of the schema definition; wherein the step of generating a second in-memory representation of source code based an the first in-memory representation of the schema definition includes performing one of context free processing and context sensitive processing; reading a portion of the schema definition that corresponds to one or an element or an attribute from a schema definition file: constructing a schema object hierarchy based on the read portion, wherein the schema object hierarchy includes a plurality of objects; compiling the schema object hierarchy into a source object hierarchy; and writing the source object hierarchy to one or more object-oriented source files.

16. The method of claim 15 further comprising generating one or more source code files based on the second in-memory representation of source code.

17. The method of claim 15 wherein each object includes code to compile itself into a source code primitive.

18. The method of claim 15 wherein the source object hierarchy includes a set of objects that represent a predetermined class source file and that has a predetermined number of members, methods and definitions.

19. The method of claim 15 wherein the source object hierarchy includes an object corresponding to a whole source file, an object corresponding to a file declaration comment, an object corresponding to a package name, an object corresponding to import statements1 and an object corresponding to class definitions.

20. The method of claim 19 wherein the object for class definition includes one of an object corresponding to declaration statement, an object corresponding to specific class member definition, and an object corresponding to method definition.

21. The method of claim 15 wherein each source object is programmed to write itself into a respective source file.

22. The method of claim 21 wherein each source object includes a toString( ) method that recursively calls toString( ) method of its descendants to write itself into a respective source file.

* * * * *

UNITED STATES PATENT AND TRADEMARK OFFICE
CERTIFICATE OF CORRECTION

| | | |
|---|---|---|
| PATENT NO. | : 7,249,345 B2 | Page 1 of 1 |
| APPLICATION NO. | : 10/086939 | |
| DATED | : July 24, 2007 | |
| INVENTOR(S) | : Samo Zorc | |

It is certified that error appears in the above-identified patent and that said Letters Patent is hereby corrected as shown below:

In column 1, line 40, delete "XTL" and insert -- XML --, therefor.

In column 2, line 53, delete "t" and insert -- the purposes of --, therefor.

In column 15, line 4, in Claim 14, delete "cdntext" and insert -- context --, therefor.

In column 15, line 14, in Claim 15, delete "an" and insert -- on --, therefor.

In column 15, line 19, in Claim 15, delete ":" and insert -- ; --, therefor.

In column 16, line 12, in Claim 19, delete "statements1" and insert -- statements, --, therefor.

Signed and Sealed this

Fifth Day of August, 2008

JON W. DUDAS
*Director of the United States Patent and Trademark Office*